Nov. 11, 1958

L. SALMON 2,859,569

JIG FOR HOLDING TWIST DRILLS

Filed Nov. 29, 1957

INVENTOR
LEONARD SALMON
BY
ATTORNEY

United States Patent Office 2,859,569
Patented Nov. 11, 1958

2,859,569

JIG FOR HOLDING TWIST DRILLS

Leonard Salmon, St. Catharines, Ontario, Canada

Application November 29, 1957, Serial No. 699,816

3 Claims. (Cl. 51—219)

This invention relates to machine tools and more particularly to a jig for sharpening drill bits.

It is an object of the present invention to provide a precision tool for accurately sharpening various types of drill bits so as to produce the desired cutting angles of the bit.

Another object of the present invention is to provide a jig of the above type for sharpening drill bits so that the biting edges of the bit are ground consistently to the same angle in each case.

Other objects of the invention are to provide a machine tool bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
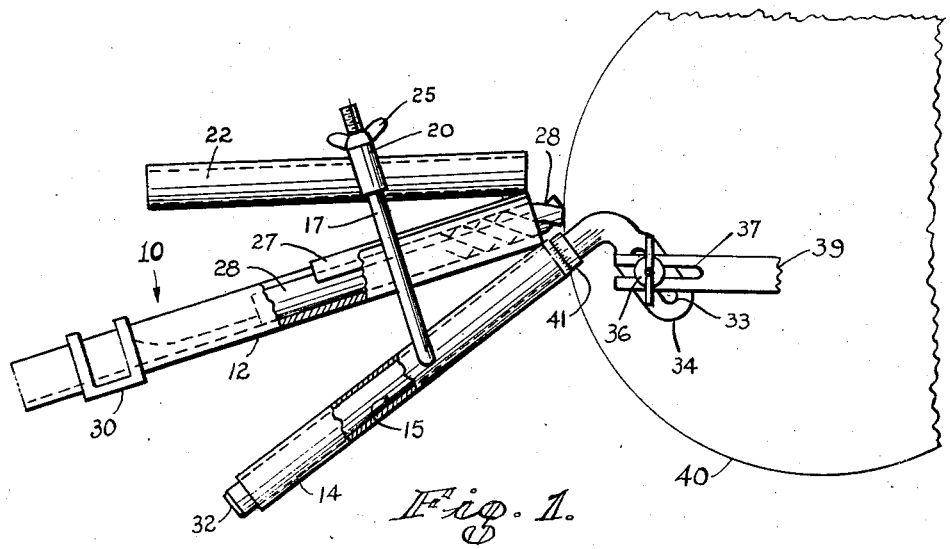
Figure 1 is a side elevational view of a device made in accordance with the present invention.
Figure 2:
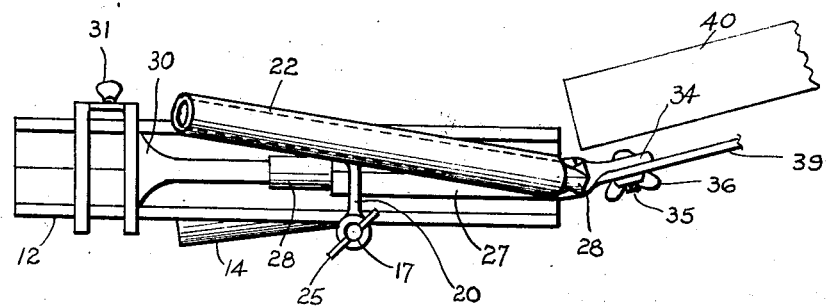
Figure 2 is a top elevational view of a device shown in Figure 1.
Figure 3:
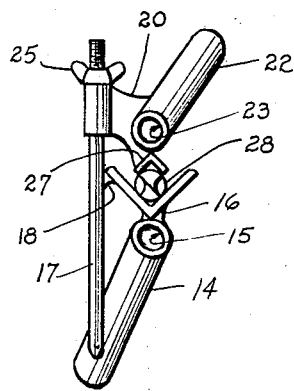
Figure 3 is an end elevational view of the front end of the device.

Referring now more in detail to the drawing, a jig for sharpening drill bits 10 made in accordance with the present invention is shown to include a V-shaped guide 12 having a tubular member 14 with a longitudinal bore 15 secured thereto, such as by a weld 16. A stud 17 is secured to the tubular member 14 and guide 12 such as by a weld 18 for slidably receiving a bracket 20 for adjustable movement in a direction normal to the guide member 12. A second tubular member 22 having a longitudinal bore 23 is integral with the bracket 20 and is adapted to be supported in any desired spaced apart position relative to the first tubular member 14 by means of the wing nut 25.

The bracket 20 also includes an inverted V-shaped element 27 which is adapted to clamp a drill bit 28 in secured engagement with the guide member 12 under the action of the wing nut 25. A longitudinal stop member 30 which is adjustably secured at any desired longitudinal position along the length of the guide member 12 by means of a thumb set screw 31 prevents rearward movement of the drill bit 28 during the sharpening operation.

The first and second tubular members 14 and 22 define acute angles with opposite sides of a symmetrical plane of the guide member 12 that extends through the apex of the V-shaped channel, for purposes hereinafter described. An L-shaped support rod 32 having a short base portion 34 provided with a slot 33 is secured to the tool rest 39 of a grinding machine by means of a bolt 35 and nut 36 which also extends through the longitudinal slot 37 of the tool rest so as to secure the rod 32 in any desired adjusted position relative to the grinding wheel 40. A vernier 41 carried by the support rod 32 controls the rotational movement of the jig as will be hereinafter described.

In actual use, the support rod 32 is clamped to the grinding machine at the proper grinding angle. The drill bit 28 is then clamped upon the guide member 12 with the end thereof protruding sufficiently to engage with the surface of the grinding wheel 40. With one of the tubular members 14 slidably supported upon the support rod 32, the jig is rotated about the longitudinal axis of the tubular member 14 so as to rotate the first cutting edge of the bit into engagement with the grinding wheel. The jig is then removed from the support rod 32 and the other tubular member 22 is inserted thereon so that the jig may be again rotated to grind the other cutting edge of the bit in a similar fashion. Since the angular relationship between the various parts is fixed, the sequential grinding of both cutting edges of the bit by the alternate engagement of both of the tubular members 14, 22, both cutting faces and edges of the bit are ground to equal angles and concentric with the center line of the bit.

While various changes may be made in detail construction, it shall be understood that such changes shall be within the spirit and scope of the present invention as defined by the appended claims.

What I claim as new and desire to protect by Letters Patent of the United States is:

1. A jig for sharpening drill bits comprising, in combination, a V-shaped guide for longitudinally adjustably supporting a drill bit having a plane of symmetry containing the apex thereof, a clamping bracket comprising an inverted V-shaped member supported for adjustable movement in a direction toward and away from said guide and overlying said guide for clamping the drill bit therebetween, a first tubular support member having a longitudinal axis defining an acute angle with one side of said plane and converging with said support member adjacent to one end thereof, a second tubular support member integral with said bracket and having a longitudinal axis defining an acute angle with the opposite side of said plane and converging with said one end of said support, and an adjustable support rod for supported engagement upon a grinding machine for selectively supporting one of said tubular members for limited rotation about its own longitudinal axis.

2. A jig for sharpening drill bits comprising, in combination, a V-shaped guide for longitudinally adjustably supporting a drill bit having a plane of symmetry containing the apex thereof, a clamping bracket comprising an inverted V-shaped member supported for adjustable movement in a direction toward and away from said guide and overlying said guide for clamping the drill bit therebetween, a first tubular support member integrally secured to said guide and having a longitudinal axis defining an acute angle with one side of said plane and converging with said support member adjacent to one end thereof, a second tubular support member integral with said bracket and having a longitudinal axis defining an acute angle with the opposite side of said plane and converging with said one end of said support and an adjustable support rod for supported engagement upon a grinding machine for selectively supporting one of said tubular members for limited rotation about its own longitudinal axis.

3. A jig for sharpening drill bits comprising, in combination, a V-shaped guide for longitudinally adjustably supporting a drill bit having a plane of symmetry containing the apex thereof, a clamping bracket comprising an inverted V-shaped member supported for adjustable movement in a direction toward and away from said guide and overlying said guide for clamping the drill bit therebetween, a first tubular support member integrally secured to said guide and having a longitudinal axis defining an acute angle with one side of said plane and converging with said support member adjacent to one end thereof, a second tubular support member integral with said bracket and having a longitudinal axis defining an acute angle with the opposite side of said plane and converging with said one end of said support and an adjustable support rod for supported engagement upon a grinding machine for selectively supporting one of said tubular members for limited rotation about its own longitudinal axis, and a stud secured to said first tubular member and said guide for slidably supporting said clamping bracket for said adjustable movement.

References Cited in the file of this patent

UNITED STATES PATENTS

| | | |
|---|---|---|
| 2,211,393 | Travis | Aug. 13, 1940 |

FOREIGN PATENTS

| | | |
|---|---|---|
| 125,395 | Australia | Sept. 9, 1947 |
| 1,088,405 | France | Sept. 8, 1954 |